United States Patent [19]

Cooper

[11] 4,193,031
[45] Mar. 11, 1980

[54] METHOD OF SIGNAL TRANSMISSION AND RECEPTION UTILIZING WIDEBAND SIGNALS

[75] Inventor: George R. Cooper, West Lafayette, Ind.

[73] Assignee: Purdue Research Foundation, West Lafayette, Ind.

[21] Appl. No.: 886,100

[22] Filed: Mar. 13, 1978

[51] Int. Cl.² .............................................. H04J 7/00
[52] U.S. Cl. ...................... 455/38; 370/50; 375/25; 455/56; 455/68
[58] Field of Search .................. 325/30, 42, 65, 38 R, 325/56, 55, 473, 62; 343/175, 176, 177; 325/39, 40, 43; 364/819, 824; 179/15 AP, 15 BA, 15 BZ, 2 EA, 2 EB

[56] References Cited

U.S. PATENT DOCUMENTS

| 2,719,188 | 9/1955 | Pierce | 179/15 BA |
|---|---|---|---|
| 3,151,295 | 9/1964 | Haviland | 325/62 X |
| 3,176,225 | 3/1965 | Ransom et al. | 179/15 BA |
| 3,197,563 | 7/1965 | Hamsher et al. | 179/15 BA |

Primary Examiner—Benedict V. Safourek
Attorney, Agent, or Firm—John R. Nesbitt

[57] ABSTRACT

A method is disclosed for signal transmission and reception utilizing wideband signals, and, more particularly, the use of time-frequency coded signals to achieve more efficient use of the electromagnetic spectrum. The method can be generally utilized for signal transmission and reception, including personal communication uses such as utilized for land-mobile radio communications. Each user is assigned a unique set of time-frequency coded waveforms for both transmission and reception, and both message and control signals are transmitted and received using the assigned unique set of signals. Message modulation is effected by digitizing the message, such as a speech message, and several types of message digitization, including PCM are set forth. For land-mobile radio service, the geographical area is divided into a series of cells each of which has a base station therein for communication with the mobile units then in the cell. Each mobile unit transmitter utilizes automatic power control to maintain the received signal level at the base station constant regardless of the location of the mobile unit within the cell.

11 Claims, 3 Drawing Figures

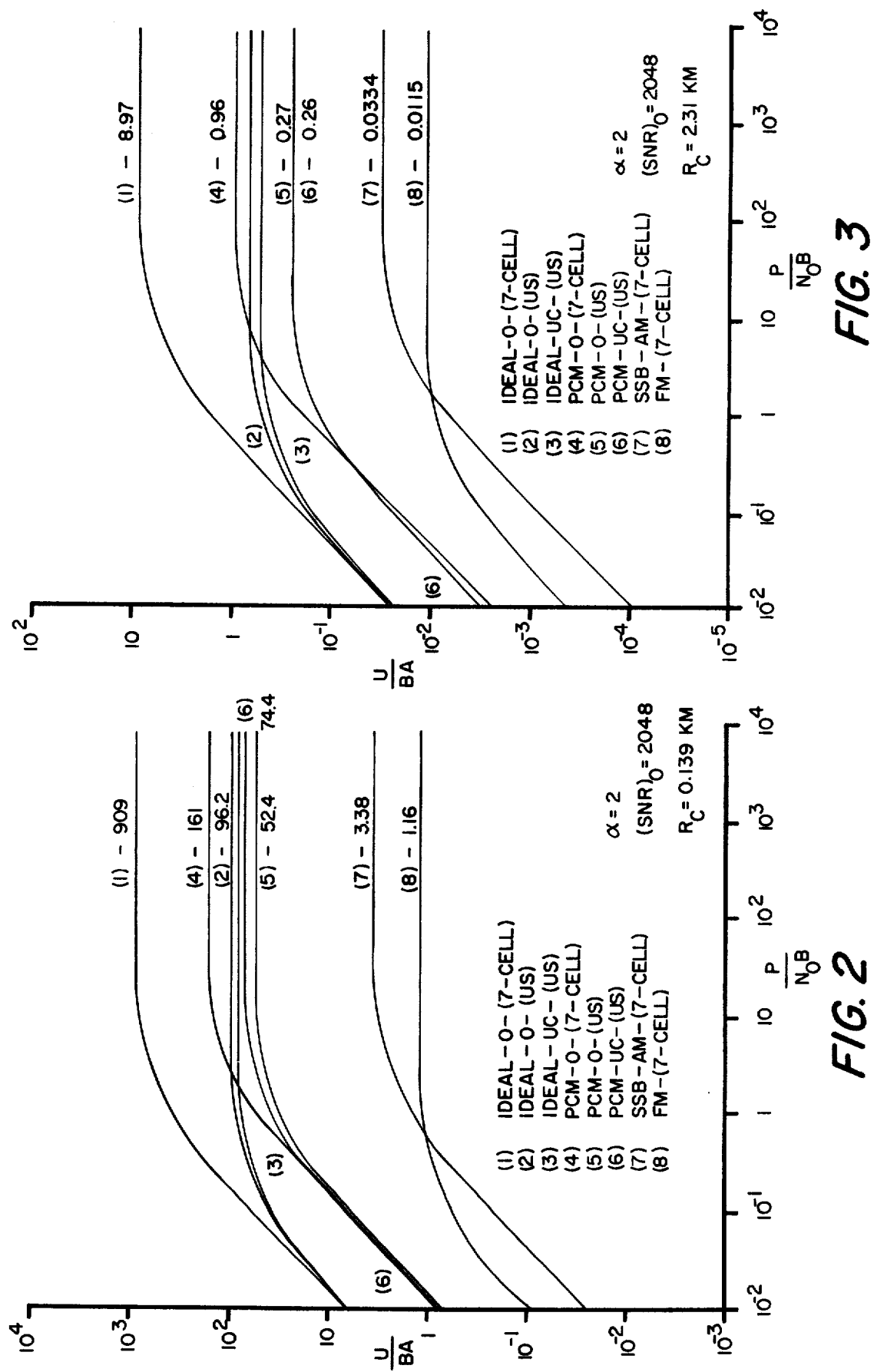

METHOD OF SIGNAL TRANSMISSION AND RECEPTION UTILIZING WIDEBAND SIGNALS

FIELD OF THE INVENTION

This invention relates to signal transmission and reception and relates, more particularly, to a method for signal transmission and reception utilizing wideband signals.

BACKGROUND OF THE INVENTION

Congestion of the electromagnetic frequency spectrum is becoming increasingly severe as the communication needs of society expands. This overcrowding is particularly acute in the frequency bands allocated to land-mobile radio services and to the so-called citizen's bands in large metropolitan areas. There are many areas in which the spectrum is being used to its capacity, so far as conventional techniques are concerned, and no further expansion of service is possible. Since these congested bands include those allocated to public safety (police, fire, ambulance, etc.), the existing limitations have serious implications with regard to the ability of such communication systems to truly meet the needs under conditions of natural disaster or national emergency.

In addition to the question of meeting immediate needs, there is little or no capability for expanding existing services to cope with population increases, or to add new services that modern technology makes possible. An example of the latter is the widespread use of personal radio telephones; a service that is certainly possible now from a technology standpoint but is not possible from the standpoint of existing spectrum allocations. It is easy to conceive of many other new services that a highly-mobile and technically-oriented society may demand.

It is clear that if the communication needs of the future are to be met in a satisfactory manner, some dramatic changes in communication technology are called for. Furthermore, these changes must take advantage of technology's emerging capability for implementing complex systems that are small, light, efficient and inexpensive. Finally, the artificial constraints imposed by obsolete legal requirements must be removed in portions (if not all) of the electromagnetic spectrum.

The most direct method of alleviating spectrum congestion is to allocate a larger portion of the spectrum to those services that need it most. While this approach is possible to some extent (and, in fact, has already been done in the 900 MHz region) it does not face up to the basic question of utilizing the spectrum more efficiently.

A second method (which will probably be implemented at some time in the future) is to require all communications between non-mobile units to utilize either a non-radiative transmission medium such as coaxial cable or a directive microwave link. This would reserve most of the electromagnetic spectrum for those services in which one or both users of a given channel are mobile.

For mobile service, a third approach that has been widely discussed in the literature is the use of cellular systems in which communication within each cell is restricted to transmission between any mobile unit and a base station. All base stations may be connected via land lines or microwave links to a central processing unit where all system control functions are coordinated and executed. It may be readily shown that spectrum utilization efficiency increases as the cell size is made smaller. Although systems employing many small cells are inherently more complex, the direction of technology makes the trade-off of complexity for efficiency more attractive. Since this trend will undoubtedly continue, it is reasonable to examine the potential of small-cell systems in other respects and to explore methods for further improving the efficiency of such systems.

The use of dynamic channel reassignment has been heretofore examined and improvements evaluated. It has been found that a seven-cell channel-reusage pattern is optimum for jointly reducing co-channel interference and increasing the capacity of the system. More recently, it has also been shown that twenty to sixty times as many users may be handled by such wideband systems when compared to conventional narrowband FM. Furthermore, these wideband systems are non-synchronous and require no unique frequency assignments. Since time synchronization is difficult to achieve in a mobile system, and since dynamic channel assignments require supervisory control, there are some significant operational advantages for the wideband system.

The promising capabilities of wideband systems make it desirable to seek additional improvements in spectrum utilization by capitalizing on the nonsynchronous properties of such signals. This makes it possible to consider discrete modulation methods for speech that are not feasible with synchronous systems such as PCM.

SUMMARY OF THE INVENTION

This invention provides a method for utilizing wideband signals for more efficient spectrum utilization in which each user is assigned a unique set of time-frequency coded waveforms that are used for both transmission and reception with transmitted messages being digitized.

It is therefore an object of this invention to provide an improved method for signal transmission and reception.

It is another object of this invention to provide an improved method for signal transmission and reception utilizing wideband signals for more efficient spectrum utilization.

It is still another object of this invention to provide an improved signaling method utilizing time-frequency coded waveforms.

It is yet another object of this invention to provide an improved signaling method wherein each user is assigned a unique set of time-frequency coded waveforms.

It is still another object of this invention to provide an improved signaling method wherein messages are digitized and each transmitted and received message is directed to a specific user through the use of unique sets of time-frequency coded waveforms.

With these and other objects in view, which will become apparent to one skilled in the art as the description proceeds, this invention resides in the novel construction, combination and arrangements of parts substantially as hereinafter described, and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best modes so far devised for the practical application of the principles thereof, and in which:

FIGS. 2 and 3 are graphs illustrating composite performance curves for two different cells and eight different modulation methods displayed as the results of a function of the input signal-to-noise ratio at a base station.

DESCRIPTION OF THE INVENTION

Figure 1:
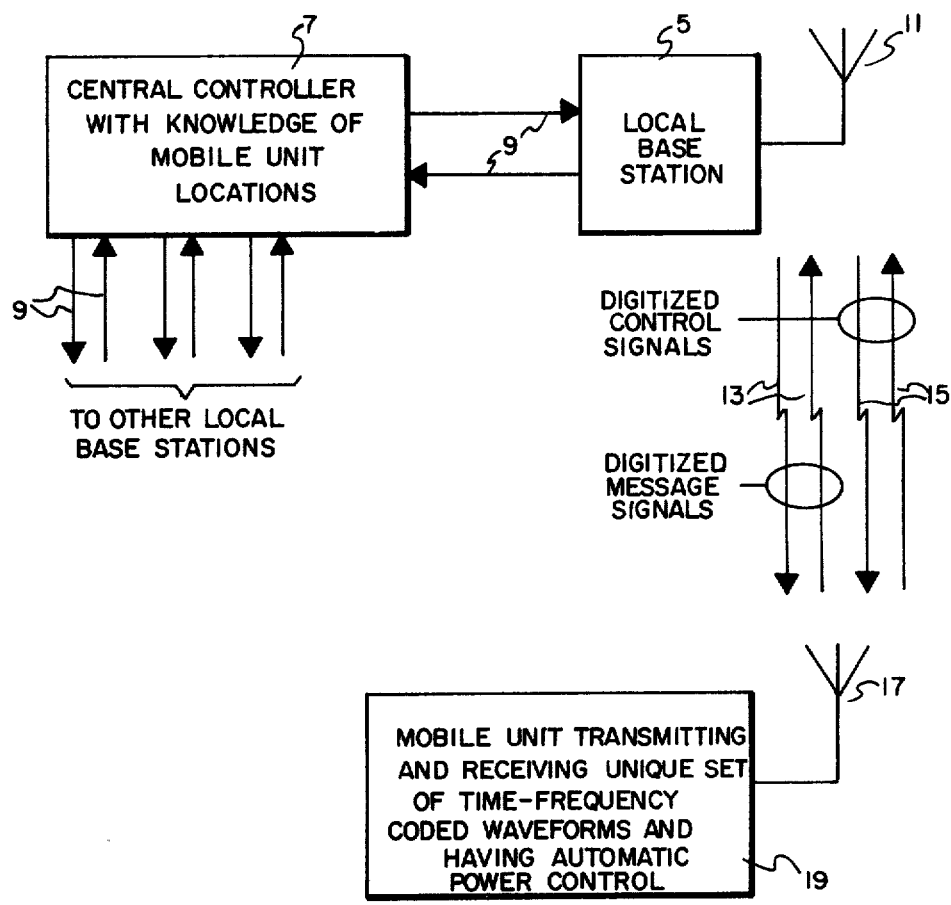
FIG. 1 is a block diagram illustrating the use of the method of this invention in land-mobile radio service.

While this invention is specifically described in connection with a land-mobile radio service, the method is applicable to a much broader range of applications. In particular, the method of this invention allows widespread use of personal communication devices requiring no assignment of discrete channels since each user is assigned a unique set of time-frequency coded waveforms.

For a land-mobile radio service, it has been found preferable to divide the geographical area to be served into non-overlapping cells each having a centrally located fixed base station 5. All base stations are connected to a central processor 7 through links 9 so that calls originating in any cell may terminate in any other cell. In order to accomplish this, it is assumed that the central processor maintains an up-to-date knowledge of the location of each mobile unit. Each local base station 5 transmits by a suitable antenna 11 control and message signals (by radiating electromagnetic energy as indicated at 13 and 15) which are received at a suitable antenna 17 at each mobile unit 19. Thus, base stations 5 can communicate with any mobile unit 19 then in the cell. The available frequency spectrum is divided such that a portion is used for mobile unit-to-base station communication and the other portion is used for base station-to-mobile unit transmission. The mobile unit transmitters utilize automatic power control that maintains the received signal level at the base station constant regardless of the location of the mobile unit within the cell.

Each mobile unit 19 is assigned a unique set of time-frequency coded waveforms that are used for both transmission and reception. Although other types of spread-spectrum waveforms are also possible, the ones set forth for use hereinafter have the advantage that they are guaranteed to have uniformly small crosscorrelation for all relative time shifts. This makes it possible to implement threshold detection in a matched-filter receiver with a minimum probability of error. Furthermore, very large signal sets, in which all pairs of signals have this property, can be constructed from elementary number theory consideration. The design and use of such signal sets is discussed in "Design of Large Signal Sets with Good Aperiodic Correlation Properties" by G. R. Cooper and R. D. Yates (TR-EE66-13. Purdue University, September 1966) and "A Method for Time-Frequency Coding for Multiple-Access Systems" by G. R. Cooper (Proc. of the Third Hawaii International Conference on System Sciences, part 2, pp. 598–602, January 1970).

Since all remote transmitters occupy the same broad frequency band, they are mutually interfering at the base station receiver. When the number of users in a given cell is large, the time-bandwidth product for each waveform must also be large. Previous calculations have indicated that time-bandwidth products on the order of $10^4$ will be required for a practical system for transmission of speech with good quality under conditions of maximum interference. A receiver with matched filters implemented with acoustic surface-wave devices can be utilized to implement the method. Clearly, the same devices can be used to generate the transmitted signals because of their bidirectional characteristics. Alternatively, charge-coupled devices can be used, or even discrete devices such as magnetic bubble memories for this application.

An advantage that goes along with the use of large time-bandwidth product signals, in addition to the required interference suppression, is the large number of signal sets available. For example, with a time-bandwidth product of $10^4$ it is possible to assign 16 waveforms to each of 40,000 potential users. Obviously not all potential users can transmit at the same time (in fact, only about 1% of them can use the system simultaneously), but the number of available waveforms is so large that there is no need for dynamic reassignment of signals.

Another advantage of utilization of time-frequency coded waveforms is its overload capability, which may be a significant feature during emergencies or periods of peak traffic. As the number of users increases, the quality of service for each user is degraded equally. For example, a system designed for an output signal-to-noise ratio of 33 dB under nominal full-load conditions will degrade to an output signal-to-noise ratio of 10 dB when overloaded to 3.5 times the full load. Furthermore, users having a need for priority status (such as public safety vehicles) can always achieve satisfactory communication by using equipment in which it is possible to over-ride the power control.

Although there are many ways in which speech messages can be digitized for message modulation, PCM with M-ary signalling has been described herein. Thus, the speech message is sampled 8000 times per second and each sample quantized into $L=2^q$ levels, where q is the number of binary digits used to encode each level. The resulting bit stream is then broken up into blocks of $k=\log_2 M$ binary digits, where M is the number of waveforms assigned to each user. Each waveform has a duration of $$T=125\ (\log_2 M/\log_2 L)\mu sec$$

and a bandwidth of $$B=(TB)\log_2 L/125\ \log_2 M)\ MHz$$

where (TB) is the time-bandwidth product required to suppress the interference by the desired amount.

As an example of the above, suppose that $M=16$, $L=64$, and $(TB)=10^4$, then each waveform has a duration of $T=83.3\mu$ sec and a bandwidth of $B=120$ MHz. A possible waveform design can consist of dividing each time interval T into 16 time chips of duration $5.21\mu$ sec and assign to each time chip one of 625 possible frequencies separated by 192 kHz. The particular sequence of frequencies assigned to each waveform is selected to achieve the one-coincidence property as described by G. R. Cooper and R. D. Yates as referenced hereinabove. If biphase coding is employed on each sequence to achieve an orthogonal set of 16 signals for each user, the total number of signal sets (and, hence, the number of potential users) achieved by this design is 24,375. Many other designs are also possible and there is no clear-cut procedure for selecting an optimum one; in fact, all should perform about equally well.

An extensive computer study of the wideband system employing PCM message modulation has been made. In order to make meaningful comparisons with other modulation methods, a figure of merit was defined as the average number of simultaneous users per megahertz per square kilometer. This figure of merit gives a measure of the density of users both with respect to geographical area and with respect to the electromagnetic spectrum. Clearly, the larger this figure of merit is, the more efficiently the communication system is utilizing its available resources; i.e., spectrum and distance.

Computations were performed for several different cell sizes and for several different output signal-to-noise ratios. Since the figure of merit does depend upon the total signal power received at the base station, the bandwidth, and the receiver noise level, it convenient to display the results as a function of the input signal-to-noise ratio at the base station. This is shown in FIGS. 2 and 3 for two different cell sizes and for eight different modulation methods. As shown, the ordinate is the figure of merit, U/BA, where U = average number of simultaneous users in each cell,
B — bandwidth occupied by mobile unit-to-base station transmissions, and
A — area of each cell. The abscissa is the receiver input signal-to-noise ration, $P/N_oB$, at the base station where
P = total average received signal power from all U users, and
$N_o$ = effective receiver noise spectral density.

It is to be noted that $N_o$ may include environmental noise or interference from other sources, but does not include the mutual interference among the set of desired signals whether originating within the cell or outside it. The radius of each cell is $R_c$, and the output signal-to-noise ratio, $(SNR)_o = 2048$ represents reasonably high quality speech. The propagation model assumed a square-law attenuation of signal strength with distance for these curves ($\alpha = 2$), although a 4th power relationship was also investigated.

The curves pertaining to the recommended modulation method are those labeled (6) PCM—UC—(US)

which denotes that PCM message modulation is employed, the signals have uniform crosscorrelation (UC) and that an undivided spectrum (US) was used so that all cells used the same portion of the frequency spectrum.

The most significant comparision is with the narrowband FM system that is standard in existing land-mobile radio service. This curve is labeled (8) FM—(7-cell)

in which the (7-cell) implies that the 7 cell channel reassignment pattern is employed to eliminate interference between adjacent cells. It is to be noted that this means that a vehicle moving from one cell to another must change channels. This is an inconvenience that is intolerable in a small-cell system, and one that is not present in the proposed wideband system with an undivided spectrum.

Curves (1), (2), and (3) are theoretical limits predicted by Shannon's channel capacity for both orthogonal signal sets and uniform cross-correlation signal sets. In all three cases the limits are those approached as the bandwidth expansion factor becomes indefinitely large. Curves (4) and (5) represent PCM with orthogonal signals. Although (4) is significantly more efficient than the recommended modulation method (as one would expect) it has three serious practical disadvantages:

(a) Channel switching is required if the vehicle moves from one cell to another.
(b) Time synchronization among all users in a given cell is required to maintain orthogonality. This is possible to achieve, but one could expect short periods of intense interference during the synchronizing interval following the initiation of a transmission.
(c) The number of orthogonal signal sets available in a given time-bandwidth product is far smaller than the number of uniform cross-correlation signal sets available. Thus, dynamic reassignment of signal sets would be necessary if the number of potential users in each cell is larger than the number of signal sets available.

Curve (5) does not possess disadvantage (a) above but does have (b) and (c). Furthermore, it is no more efficient in utilizing the spectrum than the proposed system, Curve (7) pertains to single-sideband amplitude modulation. Although it is more efficient than FM, it does have some serious stability problems (in the microwave region) and is not as efficient as the proposed system.

Table I compares the maximum values of the figure of merit for the two cases of interest and for the two different cell sizes. Table I is as follows:

Table I.

| | Comparison of U/BA | Maximum Values |
|---|---|---|
| | $R_c = 0.139$ km | $R_c = 2.31$ km |
| (6) PCM-UC-(US) | 74.4 | 0.26 |
| (8) FM-(7-cell) | 1.16 | 0.0115 |
| Improvement Ratio | 64.1 | 22.6 |

Also included are the factors by which the spectrum utilization efficiency is improved by using the recommended modulation method. The fact that the improvement is greatest in the small-cell system is both fortunate and significant since narrowband FM is not well-adapted to small-cell operation. These results also serve to illustrate the dramatic improvement that can be obtained by small-cell systems in either case.

Most conventional methods of digitizing speech messages sample the message at periodic time intervals. The resulting samples are then quantized into two or more levels depending upon the type of modulation. In general, the modulation types may be classified into one of four major categories:

(a) Pulse code modulation (PCM)
(b) Differential pulse code modulation (DPCM)
(c) Linear delta modulation (LDM)
(d) Adaptive delta modulation (ADM)

The choice among these possible methods depends upon the bit rate to be employed. For example, at bit rates above about 40 kbps the highest output signal-tonoise ratio is achieved by PCM with logarithmically tapered quantizing levels (8). Since the proposed modulation method discussed hereinabove is operating at 48 kbps, the use of conventional PCM is a reasonable choise.

In many application, however, there is no need for the message quality that a system with this bit rate is capable of providing. At lower bit rates a higher output signal-to-noise ratio may be achieved with ADM. In fact, it has been reported that bit rates as low as 7.2 kbps can yield word-intelligibility scores as high as 80 percent, a value that is acceptable for such a critical application as air traffic control. There is also an indication that adaptive versions of DPCM may yield even higher output signal-to-noise ratios than either ADM or PCM at all bit rates.

In the proposed modulation method, a reduction in bit rate can be traded directly for an increase in the number of users. Thus, if the bit rate can be dropped from the 48 kbps previously specified to, say, 8 kbps, then the figure of merit is increased by a factor of 6. Hence, alternative digitization methods must be considered for situations in which high quality speech is not required.

The use of periodic sampling is practically mandated in synchronous communication systems (most present-day digital systems are synchronous communication systems). However, the proposed modulation method, when implemented with matched filters and threshold detection, can be operated nonsynchronously. Thus, other types of speech digitization that were not suitable for synchronous communication systems can also be utilized.

Although there are many methods that might be based on nonperiodic sampling, only two are discussed herein by way of example.

Conventional sampling procedure is to observe the message amplitude at discrete time instants, usually equally spaced. An alternative is to observe the times at which the messsage passes through discrete amplitude levels, probably not equally spaced. One advantage to this procedure is that no quantization is required because the waveforms transmitted at the instant of each level crossing can be observed continuously in time at the receiver. If a signal set containing M signals is assigned to each user, then M level crossings can be transmitted. A second advantage is that no signals are transmitted during pauses in the speech message, even though the transmitter is still nominally on. Thus, unlike the periodic sampling case, no signal energy is needed to indicate the absence of a speech message. Since pauses in normal speech may occupy 25% of the total time, this factor alone will yield a significant increase in the number of users.

It is not known exactly how many amplitude levels are required to yield acceptable speech, but it is far smaller than the usual number of quantization levels in PCM because of the additional time information, and it is anticipated of the additional time information, and it is anticipated that even as few as four levels will yield acceptable intelligibility.

A differential version of this type of sampling is also possible by transmitting waveforms only when the message amplitude changes from its previous value by a prescribed amount. Only two waveforms (one for positive changes and the other for negative changes) are required to transmit a message of any amplitude.

It was demonstrated in the 1940's that intelligible speech can be transmitted by different iating the speech waveform, transmitting pulses at the zero-crossings of the differentiated waveform, converting the received pulses to steps of alternating amplitude, and integrating the result. The equivalent bit rate for such a system may be on the order of 4 to 5 kbps. Obviously the speech reproduced by such a system leaves a lot to be desired with respect to quality.

There are several possible modifications of this procedure that can also be employed. For example, the zero-crossings of the original speech signal can also be transmitted with another waveform that can be distinguished from the waveform representing the derivative zero crossings. This system also has the advantage that no signal energy is needed to transmit pauses in the speech.

Although such methods as DPCM and ADM perform a limited amount of redundancy reduction, several techniques have been developed that accomplish much more. Such devices are usually referred to as vocoders and resolve the speech into a set of constituent parts that are identified, represented by coded waveforms, transmitted, and then used to control synthesizers that recreate the speech sounds. Bit rates as low as 2.4 kbps have been achieved with such vocoders. It is clear that the recommended modulation method can be used with vocoded speech as readily as with any other. If this is done, a corresponding increase in the number of users is possible.

Apparatus for land-mobile radio service utilizing time-frequency coded waveforms is described and claimed in the co-pending U.S. Patent Application of G. R. Cooper and R. W. Nettleton, entitled "Spread Spectrum Apparatus for Cellular Mobile Communication Systems", Ser. No. 886,099, filed Mar. 13, 1978.

As can be appreciated from the foregoing, this invention provides an improved method for transmitting and receiving electromagnetic signals utilizing a unique set of time-frequency coded waveforms for each user to thereby more efficiently utilize the available frequency spectrum.

What is claimed is:

1. A method for communication utilizing radiation of electromagnetic energy, said method comprising:
   assigning a predetermined different set of time-frequency coded waveforms within a predetermined frequency spectrum to each of a plurality of users, each said set having pulses containing a multiplicity of frequencies with coding including changing the sequence of frequency occurrence;
   transmitting electromagnetic energy in said predetermined frequency spectrum with said transmitted electromagnetic energy including a predetermined set of time-frequency coded waveforms for communication by and with the assigned user of said set of time-frequency coded waveforms; and
   receiving transmitted electromagnetic energy that includes said set of time-frequency coded waveforms by and from the assigned user of said set of time-frequency coded waveforms whereby the user assigned said set of time-frequency coded waveforms can effect communication regardless of other users in the same frequency spectrum.

2. The method of claim 1 wherein said method includes digitizing messages and transmitting the same with said set of time-frequency coded waveforms.

3. The method of claim 2 wherein said messages are digitized using one of pulse code modulation, differential pulse code modulation, linear delta modulation, and adaptive delta modulation.

4. The method of claim 1 wherein said method includes providing a base station for communication with a plurality of units each of which has a predetermined set of time-frequency coded waveforms assigned thereto, said base station being capable of transmitting a plurality of predetermined sets of time-frequency coded waveforms depending upon desired communication with said units.

5. The method of claim 4 wherein a plurality of base stations are provided each of which can communicate with said plurality of units.

6. The method of claim 5 wherein said receiving units transmitted signals are received by each base station at constant signal level regardless of distance between the base station and the receiving unit.

7. A method for cellular communication utilizing a spread spectrum, said method comprising:
transmitting and receiving from a plurality of base stations in different cells different predetermined sets of time-frequency coded waveforms, each said set having pulses containing a multiplicity of frequencies with coding including changing the sequence of frequency occurrence; and
transmitting and receiving only one of said predetermined sets of time-frequency coded waveforms in each of a plurality of mobile units capable of moving between said cells whereby selected communication is established for each of said mobile units.

8. The method of claim 7 wherein said method includes dividing an available frequency spectrum with one portion being utilized for transmission from base stations to mobile units and the other portion for mobile units to base stations transmission.

9. The method of claim 7 wherein said method includes maintaining the average power constant when received by a base station from a mobile unit within the cell of that base station regardless of where said mobile unit is located within said cell.

10. The method of claim 7 wherein said method includes digitizing the message information transmitted and received and encoding the resulting binary sequences into said sets of time frequency coded waveforms.

11. The method of claim 10 wherein said method includes digitizing said message information using pulse code modulation.

* * * * *